US006930871B2

(12) United States Patent
Macanda

(10) Patent No.: US 6,930,871 B2
(45) Date of Patent: Aug. 16, 2005

(54) LIGHTNING ARRESTER DEVICE FOR LOW-VOLTAGE NETWORK

(75) Inventor: Christian Macanda, Chaville (FR)

(73) Assignee: Citel, Issy les Moulineaux (FR)

( * ) Notice: Subject to any disclaimer, the term of this patent is extended or adjusted under 35 U.S.C. 154(b) by 0 days.

(21) Appl. No.: 10/612,085

(22) Filed: Jul. 3, 2003

(65) Prior Publication Data
US 2004/0070913 A1 Apr. 15, 2004

Related U.S. Application Data

(63) Continuation-in-part of application No. 09/715,183, filed on Nov. 20, 2000, now abandoned.

(30) Foreign Application Priority Data

Nov. 19, 1999 (FR) .............................. 99 14556

(51) Int. Cl.[7] .................................................. H02H 1/00
(52) U.S. Cl. ....................................................... 361/117
(58) Field of Search ................................. 361/117, 112, 361/120, 88, 91.5; 313/231.11; 315/36

(56) References Cited

U.S. PATENT DOCUMENTS 3,588,576 A * 6/1971 Kawiecki ..................... 313/306
4,347,539 A    8/1982 Peterson et al.
5,569,972 A   10/1996 Lange
5,880,919 A    3/1999 Napiorkowski et al.

FOREIGN PATENT DOCUMENTS

CH        592 973 A     11/1977
JP         10080058      3/1998
WO       WO 98/45919    10/1998

* cited by examiner

Primary Examiner—Brian Sircus
Assistant Examiner—James A. Demakis
(74) Attorney, Agent, or Firm—Connolly Bove Lodge & Hutz LLP; Larry J. Hume

(57) ABSTRACT

A lightning arrester device for protecting an electrical circuit connected to a low-voltage network against transient overvoltages includes a plurality of gas-type spark gaps each connected directly in parallel with each other across two common nodes. Each of the plurality of gas-type spark gaps individually has a surge current rating below a desired surge current rating of the device.

12 Claims, 2 Drawing Sheets

LIGHTNING ARRESTER DEVICE FOR LOW-VOLTAGE NETWORK

CROSS-REFERENCE TO RELATED APPLICATIONS

This application is a continuation-in-part (CIP) application of application Ser. No. 09/715,183, filed on Nov. 20, 2000 now abandoned by Christian Macanda, entitled "Lightning Arrestor Device for Low-Voltage Network", the entire contents of which are incorporated herein by reference, and for which benefit is claimed under 35 U.S.C. §120, and for which priority is claimed under 35 U.S.C. §119 to French patent application 99-14556, filed Nov. 19, 1999.

BACKGROUND OF THE INVENTION

This disclosure relates to a lightning arrester device for protecting an electrical circuit connected to a low-voltage network against transient overvoltages, of the type comprising at least one protective element consisting of a gas-type spark gap.

Gas-type spark gaps are elements which normally have a very high insulation resistance, which it is possible to regard as being almost infinite, and which trip abruptly and become conducting with a very low resistance, akin to a short circuit, so as to be able to divert a strong discharge current to earth when they are subjected to transient overvoltages, the value of which exceeds a certain threshold (trip voltage of the spark gap). It is thus possible to protect electrical circuits situated downstream of the spark gap against transient overvoltages which may have diverse origins, such as for example lightning, industrial disturbances, etc. For example, for low-voltage electrical circuits, that is to say electrical circuits operating under voltages of the order of 230/400 volts, one will choose gas-type spark gaps having an A.C. trip voltage of the order of 300 to 600 volts, the trip voltage chosen being, of course, slightly greater than the normal operating voltage of the electrical circuits to be protected.

Gas-type spark gaps have a surge current rating which is more or less limited depending on their construction, that is to say they are capable of allowing through, without destruction, a greater or lesser current surge wave exhibiting standardized characteristics. The surge current rating is usually defined by a maximum discharge current, most often expressed in kiloamperes (kA) and by a wave form, itself defined by two numbers which correspond respectively to the mid-amplitude rise time and fall time of the surge wave, these two times usually being expressed in microseconds ($\mu$s). By way of example, the gas-type spark gaps most commonly used to protect low-voltage electrical circuits have a surge current rating (maximum discharge current) corresponding to 20 kA, 8/20 $\mu$s, or else 5 kA, 10/350 $\mu$s.

In service, when a current surge wave appears, if this wave exhibits characteristics below the surge current rating of the spark gap activated, the electric arc struck in the spark gap will be extinguished without damaging the spark gap. The basic characteristics of the latter (static trip voltage, insulation resistance, etc.) will therefore not be modified, so that the spark gap will again be able to fulfill its role as a protective element when another transient overvoltage occurs. On the other hand, if the current surge wave exhibits characteristics above the surge current rating of the spark gap activated, there is a high risk that the electric arc struck in the spark gap will damage the latter. If such is the case, the trip voltage of the spark gap will rise steeply. For example, it will go from 300 volts to 700 volts or more, so that, if a transient overvoltage whose amplitude is below the new trip voltage of the spark gap then occurs, the latter will no longer be able to fulfill its role as a protective element. The electric arc may even damage the spark gap to such a point that it is subsequently totally incapable of tripping in the event of an overvoltage (non-tripping state).

Transient overvoltages are a phenomena which most often occur in a manner which is completely unpredictable in time, and whose intensity cannot be predicted either. This is why, in order to increase the chances of a lightning arrester device being capable of withstanding, without destruction, a high transient overvoltage and/or several transient overvoltages occurring in succession, it is sometimes desirable to be able to use a lightning arrester device having an enhanced surge rating.

An obvious solution to this problem consists in using a gas-type spark gap intrinsically having a greater surge current rating. Such gas-type spark gaps exist on the market. They nevertheless have the drawback of being much bulkier and much more expensive than gas-type spark gaps having a smaller surge current rating, such as those cited earlier by way of example. By way of comparison, gas-type spark gaps having a surge current rating of 20 kA in 8/20 $\mu$s or 5 kA in 10/350 $\mu$s consist of cylindrical elements having a diameter of 8 mm and a length of from 6 to 8 mm, whilst gas-type spark gaps which have a surge current rating of 50 kA in 8/20 $\mu$s or 15 kA in 10/350 $\mu$s consist of likewise cylindrical elements having a diameter of around 16 mm, and a length of around 30 mm. Furthermore, the first spark gaps indicated hereinabove are standard elements, which are manufactured in large numbers at a cost price of 1.5 francs each, whilst the second spark gaps, of higher surge current rating, are special elements which are manufactured in small numbers at a cost price of around 100 francs each.

SUMMARY OF THE INVENTION

The aim of this disclosure is therefore to provide a lightning arrester device having an enhanced surge rating without using a bulky and expensive gas-type spark gap.

To this end, the lightning arrester device according to the invention is a device which comprises a set of gas-type spark gaps connected in parallel and which individually have a surge current rating below a desired surge current rating.

In one embodiment, a lightning arrester device for protecting an electrical circuit connected to a low-voltage network against transient overvoltages includes a plurality of gas-type spark gaps each connected directly in parallel with each other across two common nodes. Each of the plurality of gas-type spark gaps individually has a surge current rating below a desired surge current rating of the device.

In a further aspect of the embodiment, each of the plurality of gas-type spark gaps includes a ceramic tube containing a rare gas and having hermetically sealed ends thereon provided by conducting metal dishes which form contact terminals. Each of the conducting metal dishes may have a disc-shaped electrode affixed thereto on an internal face. The disc-shaped electrodes affixed to respective conducting metal dishes are arranged to oppose each other with a spacing therebetween within the ceramic tube.

The disc-shaped electrodes may be a refractory metal, such as tungsten, for example, or the disc-shaped electrodes may be a fusible metal such as copper or a copper alloy.

Another aspect of the embodiment of the invention may include a set of plural varistors connected in parallel. The set of plural varistors may be connected in series with the plurality of gas-type spark gaps. Further, one or more thermal disconnects arranged between the plurality of gas-type spark gaps and the set of plural varistors may be associated with at least two of the plural varistors. The at least one thermal disconnect may be configured to actuate means for visual signaling when one or more of the associated at least two of the plural varistors undergo an abnormal overheating.

In a further aspect of the invention, the plural varistors may be grouped in pairs, and a thermal disconnect may be associated with each pair of varistors. The at least one thermal disconnect may be operatively connected to a telesignalling circuit.

In another aspect of the embodiment of the invention, each of the plural varistors connected in parallel may have, within ±1%, a 1 mA clipping voltage.

Further, the ceramic tube may have at least one thread of graphite on an inner surface thereof.

In a further aspect of an embodiment of the invention, the rare gas may be substantially free of hydrogen. An inner configuration of the ceramic tube and a hydrogen content of the rare gas are selected to cause an essentially simultaneous tripping of at least two of the plurality of gas-type spark gaps in response to a transient over-voltage condition.

According to standard electrical theory, the parallel arrangement of several gas-type spark gaps does not make it possible to increase the value of the maximum discharge current (hence the surge current rating) which the parallel arrangement can allow through without damage in the event of a transient overvoltage. Specifically, because of the scatter in the characteristics of gas-type spark gaps, their trip voltages usually have values which differ slightly from one another. Consequently, when a transient overvoltage occurs, that one of the gas-type spark gaps which exhibits the smallest trip voltage will trip first and create a short circuit across the terminals of all the other spark gaps. Normally, this short circuit prevents the tripping of the other spark gaps, so that it is necessary to wait for all the current due to the temporary overvoltage to flow through the single tripped spark gap. The parallel arrangement of the spark gaps therefore has the same intrinsic surge current rating value as each individual spark gap. It was therefore a priori surprising that such a parallel arrangement could afford a solution to the problem of increasing the surge current rating which the invention aimed to solve.

Although, in principle, the solution afforded by this disclosure does not make it possible to increase the intrinsic value of the maximum discharge current permitted for the lightning arrester device, the experiments performed by the applicant with diverse designs of spark gaps have shown that the invention nevertheless makes it possible to improve the surge current rating of the lightning arrester device.

Specifically, if one uses spark gaps which include refractory metal electrodes, which have an end of life in open circuit, even if a transient overvoltage occurs and creates a current surge wave whose intensity is greater than the maximum discharge current permitted for each individual spark gap, and even if the spark gap activated by the overvoltage has been damaged by the latter, the lightning arrester device according to the invention will nevertheless be able to continue to act as protective device by virtue of the remaining spark gaps, which have not been activated by the transient overvoltage, and to do so for as long as at least one spark gap remains intact.

It is also possible to use spark gaps whose electrodes are made of a fusible metal, preferably copper or a copper-based alloy. Spark gaps of this type have an end of life in short circuit, that is to say if a transient voltage occurs which creates a current surge wave whose intensity is greater than the maximum discharge current permitted and if the spark gap activated by the overvoltage has been damaged by the latter, its resistance becomes less than 1 ohm. The experiments conducted by the applicant with this type of spark gap have shown, against all expectations, that in the event of a high transient overvoltage, the tripping of the spark gap having the smallest trip voltage is followed by the tripping of at least one other spark gap adjacent to the first spark gap, but not of all the spark gaps when there are more than three. This is entirely surprising since the tripping of the first spark gap, which causes the short circuiting of the other spark gaps, ought normally to prevent their tripping.

It has been shown that the parallel tripping of two spark gaps is systematically obtained with spark gaps of a specified type. Firstly, the technical specification of the spark gaps limits the steepness of the fall of the voltage between the two terminals of a first spark gap when the first spark gap is tripping, i.e. becoming conductive. More precisely, the arc transition time of the specified spark gap, i.e. the transition time between the state of high insulation resistance and the arc regime, is increased by modifying the composition of the gas inside the spark gap, especially by excluding hydrogen. This is achieved by using a gas free from hydrogen in the manufacturing process of the spark gap. In other words, the transition of the specified spark gap is lengthened in comparison to conventional spark gaps. For example, the modified transition time is of the order of 10 to 100 ns. Secondly, the technical specification of the spark gaps provides a fast response time of the spark gaps when an over-voltage occurs. More precisely, the inner geometry of the specified spark gap is designed such as to provide a fast response time. Especially, at least one thread of graphite is provided on the inner surface of the ceramic tube of the spark gap in order to improve the response time. Hence, when the first spark gap starts tripping in response to a transient over-voltage, a second spark gap, which is connected directly in parallel with the first spark gap between two common nodes, is polarized by the voltage across the two common nodes, before the first spark gap reaches the arc regime. Hence, the second spark gap starts tripping shortly after the first one in response to the transient over-voltage prior to a collapse of that voltage. As a consequence, at least two spark gaps become simultaneously conductive, so that each will pass half of the total current. The parallel tripping of several spark gaps can be obtained with both type of electrodes, i.e. electrodes made of refractory metal and made of fusible metal.

As an additional explanation of the phenomenon, it may be imagined that the electric arc engendered in the spark gap which tripped first creates an intense magnetic field and/or an intense spark which encourages the creation of a plasma in the adjacent spark gap(s) and, thereby, encourages their tripping. In this case, the current surge wave created by the transient overvoltage can flow through the two or three tripped spark gaps. This has the effect of dividing the intensity of the current crossing each of the tripped spark gaps by two or three and, thereby, of improving the surge current rating of the lightning arrester device.

The lightning arrestor device according to one embodiment of the invention is particularly useful to protect electrical circuits connected to a low voltage network. However, in this case, the lightning arrester device cannot be constructed solely on the basis of gas-type spark gaps. Specifically, when a gas-type spark gap trips on the occurrence of a transient overvoltage, the spark gap switches to the arc regime, this being equivalent to a quasi short circuit. The network will then deliver, across the spark gap, a current close to its short-circuit current, which the spark gap will be unable to interrupt by self-extinction. In this case, the installation will therefore be shut down systematically by the entry into action of the other devices for protection against overcurrents (circuit breaker, fuse, etc.) which are usually placed upstream of the installation. This behavior is not tolerable since each action of the lightning arrester device will bring about the unavailability of the electrical circuits of the low voltage installation.

A known solution for remedying this problem is to arrange, in series with a spark gap, components which will limit the abovementioned short-circuit current, whilst passing the transient current wave. These components may, for example, consist of varistors, in particular zinc oxide varistors.

Consequently, when the lightning arrester device according to the invention is intended to protect a low voltage electrical circuit, it may comprise, furthermore, by way of additional protective elements, in series with the said set of spark gaps, a set of varistors connected in parallel with one another.

The paralleling of the varistors is designed in such a way as to allow a balanced distribution of the surge current in each of the varistor branches: to do this, one solution is to use varistors having 1 mA clipping voltages which are very similar, preferably to within ±1%, whereas traditionally the varistors provided have tolerances of ±10%.

Preferably, as is likewise known, with a set of varistors as above, there is associated at least one thermal disconnect, which is able to actuate at least one means of visual signaling when one or more associated varistors undergo abnormal overheating.

In one embodiment of the invention, the varistors are grouped in pairs and a thermal disconnect can be associated with each pair of varistors. Furthermore, the thermal disconnect(s) is or are associated, in a known manner, with a telesignalling circuit able to signal, for example to a remotely situated monitoring station, that at least one of the varistors associated with the spark gaps exhibits a defect and should be replaced.

BRIEF DESCRIPTION OF THE DRAWINGS

Other characteristics and advantages of the invention will emerge in the course of the following detailed description of an embodiment of the invention, given by way of example with reference to the appended drawings in which.

DETAILED DESCRIPTION OF THE INVENTION

Figure 1A:
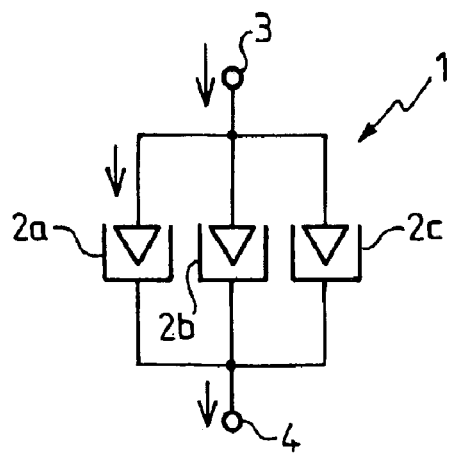
FIGS. 1a and 1b diagrammatically represent a multi-spark-gap lightning arrester device according to the invention, respectively during and after the passing of a discharge current whose intensity has exceeded the surge current rating of the gas-type spark gaps of which the lightning arrester device is composed.

Turning to FIG. 1a, lightning arrester device 1 according to an embodiment of the invention includes several gas-type spark gaps, for example three spark gaps 2a, 2b and 2c, connected in parallel between two wiring terminals 3 and 4. Terminal 3 is intended to be wired to a line (phase or neutral) of an electrical circuit to be protected, while terminal 4 is intended to be wired to earth, preferably by way of current-limiter elements, as will be described later with reference to FIG. 3.

Figure 2:
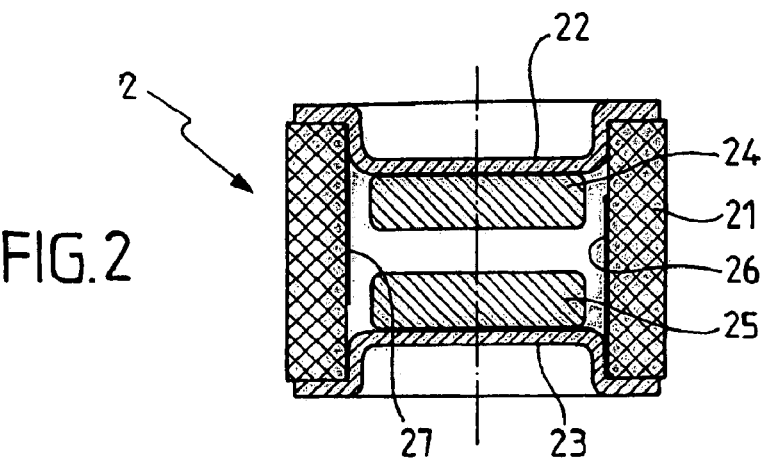
FIG. 2 is a longitudinal sectional view of a spark gap useable in the lightning arrester device according to the invention.

Each of the three spark gaps 2a, 2b and 2c can have a structure similar to that of the spark gap 2 represented in FIG. 2. The spark gap 2 includes a small ceramic tube 21, which has, for example, an outside diameter of 8 mm and a length of around 6 mm, and which is filled with a rare gas. The ends of the tube 21 are hermetically sealed by conducting metal dishes 22 and 23 which serve as contact terminals or connection terminals when the spark gap is in service. The ends of the tube 21 are metallized and the dishes 22 and 23 are fixed to the tube 21, for example by soldering. Two disc-shaped electrodes 24 and 25 are fixed respectively to the dishes 22 and 23, on their internal face, for example by soldering. The two electrodes 24 and 25 face one another with a predefined spacing which partly determines the value of the trip voltage of the spark gap. In order to aid tripping, several threads of graphite 26, 26 are, preferably, formed on the inside cylindrical surface of the tube 21, the threads 26 being in electrical contact with the dish 23 and the threads 27 with the dish 22.

The electrodes 24 and 25 can be made of a refractory metal such as tungsten, in which case the spark gap 2 usually has an end of life in open circuit (the trip voltage becoming very high), or they may be made of a fusible metal such as copper or a copper-based alloy, in which case the spark gap 2 usually has an end of life in short-circuit (resistance less than 1 ohm).

If the circuit or the electrical installation to be protected against transient overvoltages normally operates with an A.C. supply voltage of 230 V, the gas-type spark gaps 2a, 2b and 2c can be, for example, spark gaps having an A.C. trip voltage of around 300 V and a surge current rating of 20 kA in 8/20 µs or 5 kA in 10/350 µs. Of course, this embodiment is not limited to these values. Thus, in particular, the spark gaps could be chosen in such a way as to exhibit a higher trip voltage if the electrical circuits to be protected are planned to operate normally at a supply voltage which is itself higher, for example at 400 V, in which case the A.C. trip voltage can be chosen in such a way as to be greater than 500 V.

Neither is this embodiment of the invention limited to a lightning arrester device comprising three spark gaps in parallel. The lightning arrester device can, indeed, include as many spark gaps in parallel as one desires, the number of spark gaps being limited only by the maximum bulk and/or the maximum cost which have been fixed beforehand for the lightning arrester device. In practice, the number of spark gaps will be limited in such a way as not to exceed the unit cost of a gas-type spark gap of greater surge current rating, or a multiple of this unit cost if one can accept the use of several gas-type spark gaps of higher surge rating.

With the lightning arrester device according to an exemplary embodiment of the invention, if one uses spark gaps having refractory electrodes and if a transient overvoltage of greater amplitude than the trip voltage of the spark gaps occurs, one of the spark gaps, for example the spark gap 2a, will trip first. The spark gap which trips first is generally the one which has the lowest dynamic trip voltage. Consequently, the other two spark gaps 2b and 2c will be short-circuited by the tripped spark gap 2a and will not themselves be able to trip. Only the spark gap 2a will then pass the entire discharge current created by the current surge wave and the other two spark gaps 2b and 2c will be preserved.

If the current wave crossing the spark gap 2a exhibits characteristics below the surge rating of this spark gap, the latter's basic characteristics (static trip voltage, insulation resistance, etc.) will not be modified and the lightning arrester device will retain its entire surge current rating capacity.

Figure 1B:
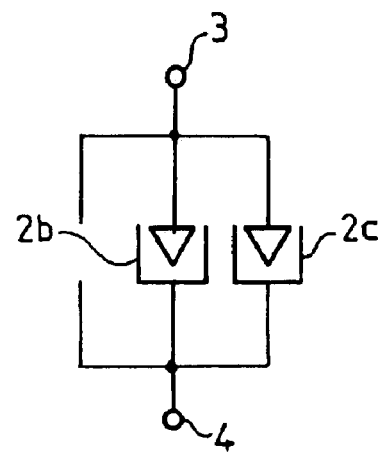

On the other hand, if the current wave crossing the spark gap 2a has an intensity greater than the maximum discharge current of this spark gap, the latter's basic characteristics will be modified. In particular, its trip voltage will rise steeply to the point that, if the surge current rating characteristic of the spark gap has been greatly exceeded, the said spark gap will be able to go definitively to a state of non-tripping in open circuit. The situation is then equivalent to disconnecting the deficient spark gap 2a, as shown in FIG. 1b. The lightning arrester device according to the invention is then reduced to the two spark gaps remaining in parallel, namely the spark gaps 2b and 2c, but this does not affect its basic characteristics since it will still be capable of withstanding at least once and of still fulfilling its role of protective device even if another overvoltage occurs and creates a current wave whose intensity exceeds the surge current rating of one or other of the two remaining spark gaps 2b and 2c. In this sense, it may therefore be said that the lightning arrester device according to the invention has a greater surge current rating than that of each of the spark gaps of which it is composed. If n denotes the number of spark gaps of which the lightning arrester device according to the invention is composed, the number of acceptable surges (without destruction) is therefore equal to n−1.

The lightning arrester device shown on FIG. 1a can be improved by using spark gaps 2a, 2a, 2c, which are designed such as to be able to trip simultaneously in parallel with one another. For that purpose, the tube of ceramic 21 is filled with a gas substantially free from hydrogen in order to lengthen the arc transition time of the spark gaps. In those spark gaps, the response time, which is needed to initiate the transition to the arc regime starting from the occurrence of a current surge wave, is set to a sufficiently low value. As known to those skilled in the art, the response time can be controlled by setting the distance between the tip of each thread of graphite 26 and 27 and the opposite electrode 24 and 25. Thanks to those specifications, at least two of the spark gaps 2a to 2c can trip simultaneously in response to a transient overvoltage. Thus, the corresponding current surge wave will be passed by at least two spark gaps, so that the tripped spark gaps will retain their basic characteristics even when the current wave has an intensity up to at least approximately twice the maximum discharge current of the weakest spark gap.

Referring now to FIG. 3, one can again see the set of three spark gaps 2a–2c, connected in parallel, the wiring terminal 3 being wired to a line L (phase or neutral) of a supply network. The other wiring terminal 4 is wired to earth. Between the set of three spark gaps 2a–2c and the terminal 4 is interposed in series a set composed of several varistors 5a to 5f connected in parallel with one another, for example zinc oxide varistors.

In the example represented, six varistors are provided, although this number does not constitute a limitation of the invention. In fact, the total number of varistors is chosen in such a way as to achieve a given discharge current and/or to obtain a certain degree of redundancy should one or more varistors become deficient.

In an exemplary embodiment, the varistors 5a to 5f are grouped in pairs 5a, 5b; 5c, 5d and 5e, 5f and with each pair of varistors there is associated a thermal disconnect 6a, 6b, 6c, able to disconnect the corresponding pair of varistors with respect to the set of spark gaps 2a–2c if one and/or the other of the two varistors of the associated pair of varistors undergoes abnormal overheating. This may happen, in particular, at the end of life of the varistors. In this case, it is necessary to disconnect the deficient varistor or varistors, since they could blow up abruptly, causing damage to the other surrounding components (contrary to spark gaps with refractory electrodes which remain in open circuit without causing damage).

Each of the three thermal disconnects 6a, 6b and 6c is thermally bound to the corresponding pair of varistors 5a, 5b; 5c, 5d and 5e, 5f, as is indicated diagrammatically by the dashed links 7a, 7b, 7c, respectively. Furthermore, each thermal disconnect 6a, 6b or 6c is configured so as to be able to actuate a means of visual signaling 8a, 8b or 8c, as is indicated diagrammatically by the dashed link 9a, 9b or 9c.

Each pair of varistors, such as for example the pair 5a, 5b, as well as the thermal disconnect and the means of visual signaling which are associated with the said pair of varistors, such as for example the thermal disconnect 6a and the means of visual signaling 8a, can include a module similar to that described in French Patent application FR-2 761 543.

Furthermore, each thermal disconnect 6a, 6b or 6c is configured so as to be able to act on a microcontact 10, as is indicated diagrammatically by the dashed link 11, so as to cause the microcontact 10 to change state when one of the disconnects 6a, 6b or 6c operates as a function of a deficiency of one of the varistors 5a to 5f. The microcontact 10 is connected between two wiring terminals 12 and 13, which are intended to be wired to a bifilar telesignalling line 14 ending, for example, at a remotely situated monitoring station. Thus, when the microcontact changes state, it is possible to signal to an operator situated remotely that one of the thermal disconnects 6a, 6b or 6c has operated by reason of a deficiency of one of the varistors 5a to 5f.

In addition to the advantages already mentioned, the other advantages achieved by such an arrangement are the following:

a) the leakage current of the lightning arrester device can be almost eliminated by virtue of the high insulation resistance and of the reduced rating of the gas-type spark gaps;

b) it is possible to increase (to a certain extent) the maximum nominal operating voltage, usually denoted Uc, of the electrical circuit intended to be protected by the lightning arrester device, without influencing the level of protection, usually denoted Up, that is to say the voltage which is actually experienced by the said electrical circuit while a current wave is crossing the lightning arrester device by reason of a transient overvoltage.

Specifically, Uc is determined by the static trip voltage of the spark gaps, while Up is determined by the residual voltage of the varistors. This characteristic allows the use of the lightning arrester device on unstable and fluctuating electrical networks.

Figure 3:
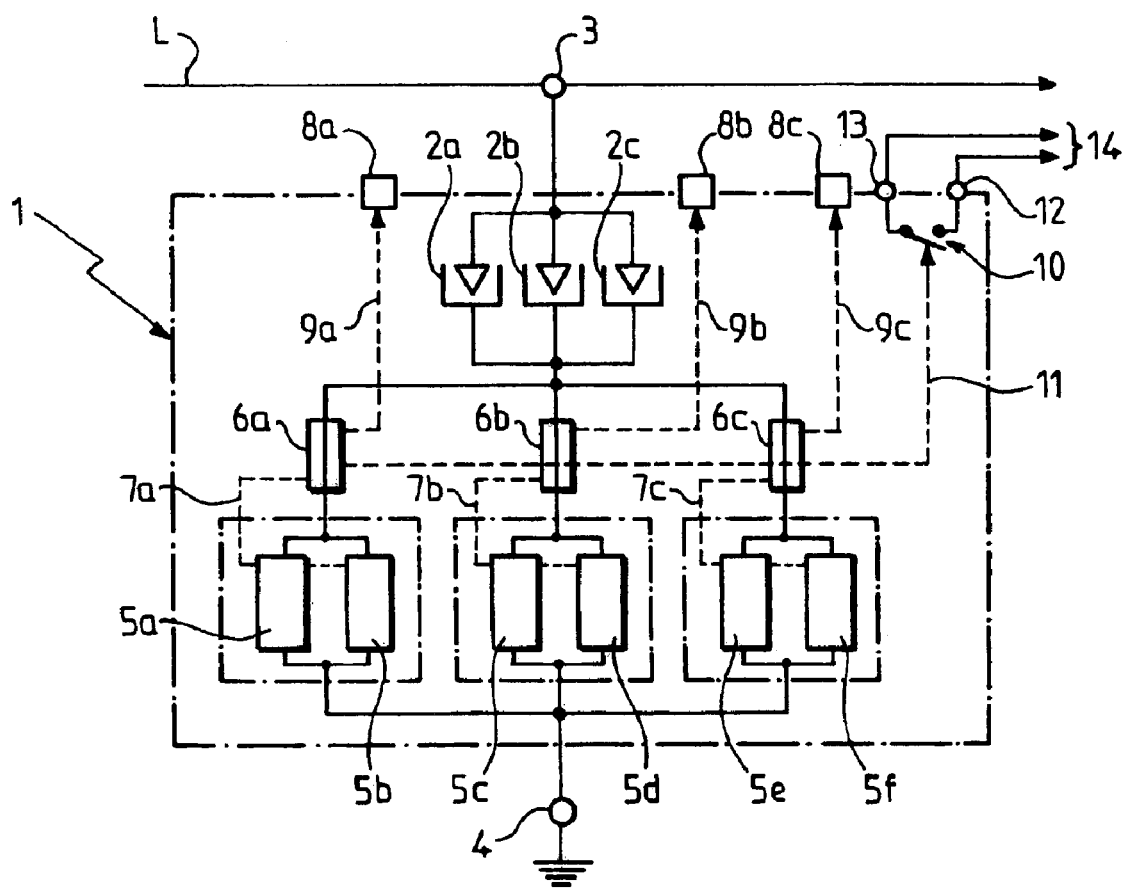
FIG. 3 is a more detailed electrical diagram of a lightning arrester device according to the invention, used to protect a low voltage network.
Figure 4:
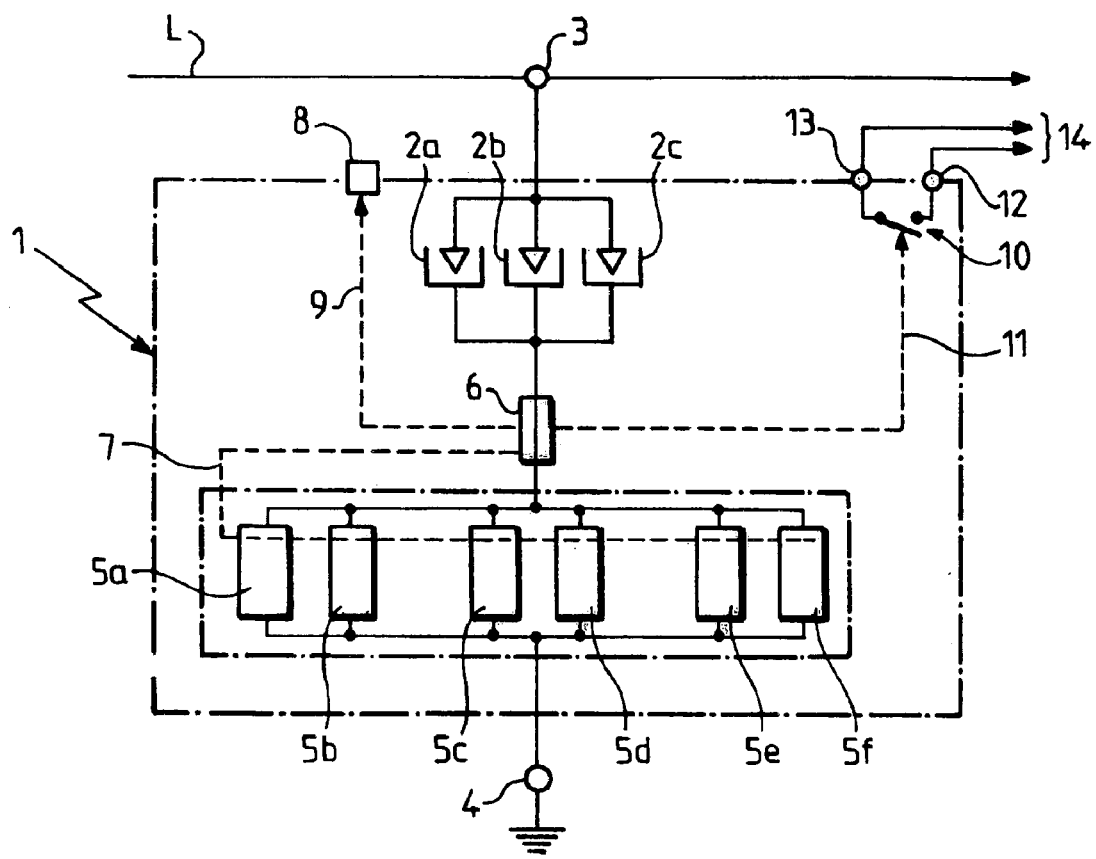
FIG. 4 shows a variant embodiment of the electrical diagram of FIG. 3.

In the embodiment represented in FIG. 3, there is a provision to group the varistors 5a to 5f in pairs and to associate with each pair of varistors a thermal disconnect 6a, 6b or 6c, itself configured so as to be able to actuate a means of visual signaling 8a, 8b or 8c, respectively. However, the invention is not limited to such a configuration. Specifically, as shown in FIG. 4, it is also possible to adopt a simpler configuration, in which a single thermal disconnect 6 is associated with all the varistors 5a to 5f, as is indicated diagrammatically by the dashed link 7. A single means of visual signaling 8 is then provided, linked to the thermal disconnect 6 by the link 9. For the remainder, the diagram of FIG. 4 is identical to that of FIG. 3 and will therefore not be described again in detail.

The configuration represented in FIG. 4 is advisable for example when using, as spark gaps 2a to 2c, spark gaps with fusible electrodes which have an end of life in short-circuit. In this case, if a transient overvoltage of higher amplitude than the trip voltage of the spark gaps occurs and if the surge current wave is of small amplitude, the spark gap having the smallest dynamic trip voltage will pass the entire discharge current without the basic characteristics of this spark gap being modified, as in the case where one uses spark gaps with refractory electrodes.

In the embodiments represented in FIGS. 3 and 4, it is advantageous to use spark gaps which have a structure similar to that shown in FIG. 2, and which are able to trigger in parallel with one another. Such spark gaps may have refractory metal or fusible metal electrodes 24 and 25. The design of such a spark gap provides both a fast response time, due to the inner configuration of the spark gap, including especially the provision of at least one thread of graphite 26 or 27 on the inner surface of the ceramic tube 21, and a lengthened arc transition time, due to the absence of hydrogen within tube 21.

When using such spark gaps, if the surge current wave is of high amplitude, the "weakest" spark gap trips, followed almost instantaneously by one or two other spark gaps adjacent to the "weakest" spark gap. As a result of this, the discharge current (Isurge) passed by each tripped spark gap is divided approximately by two or three. If Isurge/2 or Isurge/3, as appropriate, is below the maximum discharge current (Imax) allowable for each of the tripped spark gaps, the latter will not be impaired and the lightning arrester device will again be able to operate if another transient overvoltage occurs subsequently.

On the other hand, if the surge current wave had a very high amplitude (Isurge/2 or Isurge/3>Imax), at least one of the tripped spark gaps will reach its end of life. On the one hand, if the spark gaps 2a to 2c have an end of life in open circuit, the lightning arrester device remains active as a protective device as long as at least one of them remains intact. On the other hand, if the spark gaps 2a to 2c have an end of life in short-circuit, at least one of the tripped spark gaps is short-circuited and remains so after the surge wave has passed. This will trigger the end of life of the lightning arrester device. Specifically, in this case, the end of life of the spark gap which has remained short-circuited and, consequently, of the entire circuit will be clearly signaled both by the means of visual signaling 8 (FIG. 4) and by the telesignalling line 14 if it is present. Specifically, the network of spark gaps 2a to 2c in parallel having a lower surge current rating than the network of varistors 5a to 5f, if one of the spark gaps remains short-circuited after an excessive surge current, the varistors 5a to 5f are then subjected to the voltage of the electrical network. Since this voltage is above the operating voltage of the varistors, the latter will then operate in permanent clipping mode for a few seconds, and will then undergo thermal runaway. This has the effect of triggering the thermal disconnect 6 which, in turn, opens the circuit (and hence interrupts the fault current) and actuates the means of visual signaling 8 and the microcontact 10 which is connected to the telesignalling line 14.

Of course, the embodiments of the lightning arrester device which have been described hereinabove have been given purely and solely by way of indication, and numerous modifications may be made by the person skilled in the art without thereby departing from the scope of the invention. Thus, in particular, the number of spark gaps may be smaller (but at least equal to two) or larger than that of the example represented in FIGS. 1a, 3 and 4.

What is claimed is:

1. A lighting arrester device for protecting an electrical circuit connected to a low-voltage network against transient overvoltages, the device comprising:
   a plurality of gas-type spark gaps each connected directly in parallel with each other across two common nodes,
   wherein each of the plurality of gas-type spark gaps individually has a surge current rating below a desired surge current rating of the device,
   wherein each of the plurality of gas-type spark gaps includes a ceramic tube containing a rare gas and having hermetically sealed ends thereon provided by conducting metal dishes which form contact terminals,
   wherein each of the conducting metal dishes has a disc-shaped electrode affixed thereto on an internal face,
   wherein the disc-shaped electrodes affixed to respective conducting metal dishes oppose each other with a spacing therebetween within the ceramic tube, and
   wherein the rare gas is substantially free of hydrogen.

2. The device of claim 1, wherein the disc-shaped electrodes comprise a refractory metal.

3. The device of claim 1, wherein the disc-shaped electrodes comprise tungsten.

4. The device of claim 1, wherein the disc-shaped electrodes comprise a fusible metal.

5. The device of claim 1, wherein the disc-shaped electrodes comprise copper.

6. The device of claim 1, further comprising a set of plural varistors connected in parallel, said set of plural varistors being connected in series with the plurality of gas-type spark gaps.

7. The device of claim 6, further comprising at least one thermal disconnect associated with at least two of the plural varistors,
   said at least one thermal disconnect being arranged between the plurality of gas-type spark gaps and the set of plural varistors,
   said at least one thermal disconnect being configured to actuate means for visual signaling when one or more of the associated at least two of the plural varistors undergo an abnormal overheating.

8. The device of claim 7, wherein the plural varistors are grouped in pairs and wherein a thermal disconnect is associated with each pair of varistors.

9. The device of claim 7, wherein the at least one thermal disconnect is operatively connected to a telesignalling circuit.

10. The device of claim 6, wherein each of the plural varistors connected in parallel has a 1 mA clipping voltage within ±1%.

11. The device of claim 1, wherein the ceramic tube comprises at least one thread of graphite on an inner surface thereof.

12. The device of claim 1, wherein an inner configuration of the ceramic tube and a hydrogen content of the rare gas are selected to cause an essentially simultaneous tripping of at least two of the plurality of gas-type spark gaps in response to a transient over-voltage condition.

* * * * *